United States Patent [19]

Brake

[11] 4,370,503

[45] Jan. 25, 1983

[54] CATALYST FOR METHYLAMINES PRODUCTION

[75] Inventor: Loren D. Brake, Wilmington, Del.

[73] Assignee: E. I. Du Pont de Nemours and Company, Wilmington, Del.

[21] Appl. No.: 247,136

[22] Filed: Mar. 24, 1981

[51] Int. Cl.$^3$ .................... C07C 85/02; C07C 85/06
[52] U.S. Cl. .................. 564/474; 252/455 R; 564/479
[58] Field of Search .................. 564/479, 474

[56] References Cited

U.S. PATENT DOCUMENTS

| | | | |
|---|---|---|---|
| 3,384,667 | 5/1968 | Hamilton | 564/479 |
| 4,082,805 | 4/1978 | Kaeding | 564/474 |
| 4,191,709 | 3/1980 | Parker et al. | 564/479 |
| 4,205,012 | 5/1980 | Parker et al. | 564/479 |
| 4,254,061 | 3/1981 | Weigert | 564/479 |

FOREIGN PATENT DOCUMENTS

| | | | |
|---|---|---|---|
| 134518 | 12/1977 | German Democratic Rep. | 564/474 |
| 2013660 | 8/1979 | United Kingdom | 564/479 |

*Primary Examiner*—John Doll

[57] ABSTRACT

In the catalytic preparation of methylamines from methanol or dimethyl ether and ammonia using a silica-alumina catalyst, catalyst coking and byproduct formation are reduced and reaction speed and catalyst thermal stability are enhanced when a catalyst containing a high level of alumina is used.

3 Claims, No Drawings

CATALYST FOR METHYLAMINES PRODUCTION

DESCRIPTION

Technical Field

This invention relates to improved catalysts for the preparation of methylamines from methanol or dimethyl ether and ammonia. It is more particularly directed to such catalysts which are silica-alumina combinations containing a high proportion of alumina.

BACKGROUND AND SUMMARY OF THE INVENTION

The methylamines, mono-, di- and trimethylamine, are commodities in the chemical industry, widely used as starting materials in the preparation of other chemicals.

The methylamines can be prepared by several methods. The most common of these is the continuous catalytic reaction of methanol or dimethyl ether and ammonia, using a silica-alumina dehydration catalyst containing a low proportion, i.e., 10–15% by weight, of alumina.

While such a catalyst is generally satisfactory, it has a tendency to coke, which makes it necessary to replace the catalyst more frequently than is desirable. By "coke" is meant the phenomenon by which the surface of the catalyst becomes coated with carbon, thus blocking its pores and reducing its effectiveness.

It has now been found that this coking can be minimized if, instead of the conventional catalyst containing a low proportion of alumina, one uses a catalyst containing a high proportion, i.e., 87–99%, by weight, of alumina. Surprisingly, use of such a catalyst according to the invention not only reduces the amount of coking but also increases the rate of the methanol/dimethyl ether-ammonia reaction over the rate obtained with the conventional low alumina catalyst and reduces the amounts of amine byproducts formed, especially N-methylisobutylamine, N,N,-dimethylisobutylamine, ethylamine, propylamine and N-methylpropylamine. In addition, the catalysts of the invention have better thermal stability than the conventional low-alumina catalyst, which makes them effective for a longer period.

DETAILED DESCRIPTION OF THE INVENTION

The methanol-ammonia reaction is well-known and is described in detail in "Effect of Operating Variables on Methylamine Production", Richard S. Egly and Everett F. Smith, Chemical Engineering Progress, May, 1948, the text of which is incorporated into this specification to show how the reaction is conducted.

The reaction proceeds according to the general equations $$CH_3OH \text{ or } CH_3OCH_3 + NH_3 \rightarrow CH_3\text{-}NH_2 + H_2O$$

$$CH_3\text{-}NH_2 + CH_3OH \rightarrow (CH_3)_2NH + H_2O$$

$$(CH_3)_2NH + CH_3OH \rightarrow (CH_3)_3N + H_2O$$

The product of the reaction is a thermodynamic equilibrium mixture of mono-, di- and trimethylamine. In commerical practice, more of one amine is generally desired than of the others, so it is customary to recycle the least desirable amine to the reactor. Thus, the starting material is ordinarily a mixture of methanol and/or dimethyl ether and a recycled amine or amines.

The reaction is ordinarily conducted continuously in a column reactor, in the vapor phase, generally at a temperature of 350°–500° C. and a pressure of 690–3450 kPa (100–500 psig). The catalyst is packed into the reactor in the conventional way, and the premixed and preheated reactants are passed through it, preferably downwardly. Residence time of the reactants in the reactor are determined according to well-known chemical engineering principles, as are the methods of separating the methylamine products and refining them.

The catalysts of the invention contain 1–13%, by weight of silica and 87–99%, by weight of alumina, preferably 3–10% of silica and 90–97% of alumina, even more preferably about 6% of silica and about 94% of alumina. A catalyst especially suited for use according to the invention is a 6% silica/94% alumina combination sold by Harshaw Chemical Company as Al-1602.

The catalysts can be made by the well-known method of coprecipitating appropriate amounts of sodium silicate and aluminum nitrate from aqueous solution by bringing the solution to a pH of about 11 with sodium- or ammonium hydroxide, at a temperature of 50°–70° C. The resulting gel, a mixture of hydroxides, is then dried to a free-flowing powder, pelleted and calcined at 450°–650° C. to give a catalyst of the invention.

The catalyst is customarily used in the form of cylindrical pellets. Pellet size is selected according to recognized chemical engineering principles, and usually ranges from 3–130 mm (⅛ inch to about ½ inch) in all dimensions. The pore volume of the pellets and their total surface area are likewise a matter of choice, and will generally range from 0.2–0.8 cc/g and 100–250 $m^2/g$.

EXAMPLE (Best Mode)

In the following description, all parts are by weight.

Three thousand parts of Harshaw Al-1602 in the form of 6.5 mm (¼ inch) cylindrical pellets were packed into an adiabatic column reactor having a length/diameter ratio of 2.0. This catalyst bed was preheated to 350° C. with ammonia.

Into the top of the reactor was then continuously fed a vaporized mixture of
  ammonia: 4352 parts
  trimethylamine (recycled): 7552 parts
  methanol: 4096 parts
preheated to 370° C.

The vapors were passed downwardly through the catalyst bed at a rate of 16,000 parts per hour. Autogenous pressure in the reactor was 1380 kPa (200 psig) and the reactor bed temperature reached a maximum of 435° C.

The vapors leaving the reactor were condensed to give a product having the average composition
  Monomethylamine: 1422 parts
  Dimethylamine: 2110 parts
  Trimethylamine: 4814 parts
  $NH_3$: 3566 parts
  Methanol: 80 parts
  Water: 4014 parts After 5 months of continuous use, the catalyst was found to have picked up only about 1%, by weight, of carbon.

I claim:

1. In the catalytic preparation of methylamines from methanol or dimethyl ether and ammonia using a silica-alumina catalyst, the improvement which comprises using a catalyst which contains, by weight, 1–13% of silica and 87–99% of alumina.

2. The process of claim 1 in which the catalyst used contains, by weight, 3–10% of silica and 90–97% of alumina.

3. The process of claim 1 in which the catalyst used contains, by weight, about 6% of silica and about 94% of alumina.

* * * * *